United States Patent [19]

Graton

[11] Patent Number: 4,963,119
[45] Date of Patent: Oct. 16, 1990

[54] TORSION DAMPING DEVICE INCLUDING VISCOUS DAMPING MEANS, IN PARTICULAR FOR AUTOMOTIVE VEHICLES

[75] Inventor: Michel Graton, Paris, France
[73] Assignee: Valeo, Paris, France
[21] Appl. No.: 469,922
[22] Filed: Jan. 24, 1990

[30] Foreign Application Priority Data

Feb. 3, 1989 [FR] France .................. 89 01388

[51] Int. Cl.⁵ .............................................. F16D 13/68
[52] U.S. Cl. ............................... 464/24; 192/106.2; 464/68
[58] Field of Search .................. 464/24, 27, 63, 64, 464/66, 68; 192/106.2

[56] References Cited

U.S. PATENT DOCUMENTS

| | | | |
|---|---|---|---|
| 4,651,860 | 3/1987 | Nagano | 464/68 X |
| 4,669,592 | 6/1987 | Alas et al. | 192/106.2 |
| 4,698,045 | 10/1987 | Billet et al. | 464/68 |
| 4,883,156 | 11/1989 | Rohrle et al. | 464/63 X |
| 4,892,178 | 1/1990 | Damon et al. | 192/106.2 |
| 4,908,004 | 3/1990 | Graton et al. | 464/64 |

FOREIGN PATENT DOCUMENTS

| | | |
|---|---|---|
| 294049 | 12/1988 | European Pat. Off. . |
| 0304169 | 2/1989 | European Pat. Off. . |
| 1501465 | 10/1967 | France . |
| 2597181 | 10/1987 | France . |
| 2614081 | 10/1988 | France . |
| 566626 | 1/1945 | United Kingdom . |

Primary Examiner—Thomas R. Hannon
Attorney, Agent, or Firm—Charles E. Brown; Charles A. Brown

[57] ABSTRACT

A torsion damping device comprises guide rings, a damper plate, and a viscous damping assembly of the kind confined within the interior of a two-piece housing. A coupling is provided for coupling this housing with the sub-assembly consisting of the guide rings, the hub and the damper plate, and for assuring its rotation with respect to this sub-assembly after a clearance has been taken up. This coupling is provided between firstly, one of the two parts of the housing and the guide rings, and secondly between the other part of the housing and the damper plate. The invention is applicable to automotive vehicles.

10 Claims, 3 Drawing Sheets

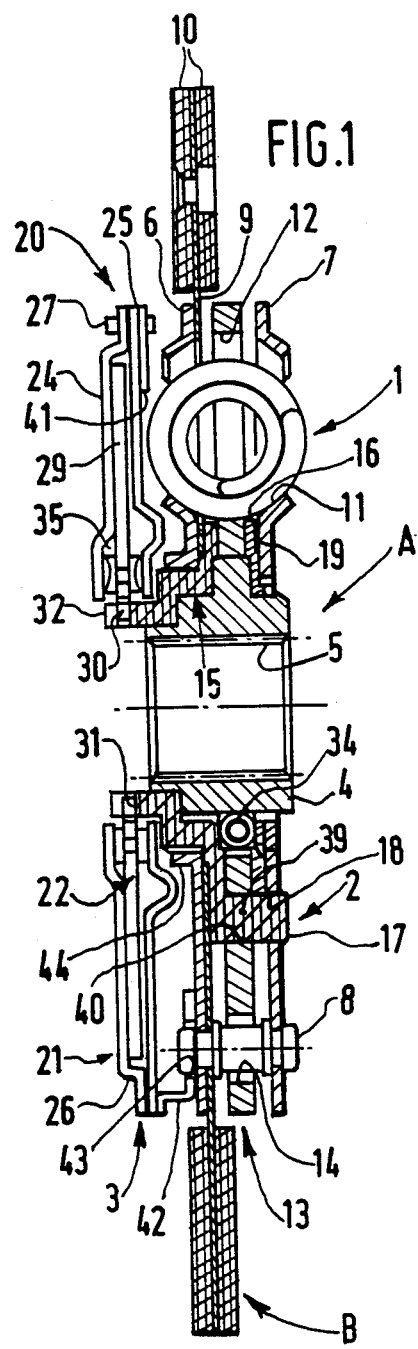
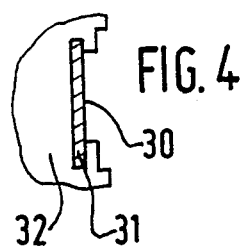
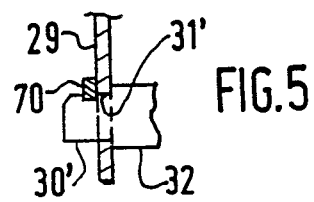
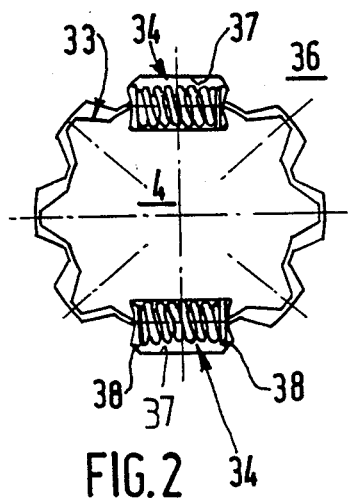

TORSION DAMPING DEVICE INCLUDING VISCOUS DAMPING MEANS, IN PARTICULAR FOR AUTOMOTIVE VEHICLES

FIELD OF THE INVENTION

The present invention relates to torsion damping devices, in particular for automotive vehicles, of the kind comprising two coaxial parts which are mounted for movement with respect to each other within the limits of a predetermined angular displacement and against the action of resilient means and damping means, the damping means comprising dry friction damping means and a viscous damping means.

BACKGROUND OF THE INVENTION

A damper of the above kind is described in European published patent application No. EP 0 304 169A, and comprises two guide rings which are arranged on either side of a damper plate. Either the damper plate is, or the guide rings are, coupled with a hub, for rotation with the latter after an initial clearance has been taken up. The dry friction damping means are operatively connected between the damper plate and the guide rings. The viscous damping means is located outside the zone which is delimited by the guide rings, and is confined within a housing which consists of two portions which are arranged for rotational or angular movement with respect to each other.

Viscous damper means, for coupling in common rotation, are provided firstly between the hub and one of the two said portions of the viscous damper housing, and secondly between the other one of the viscous damper housing portions and that one of the two relatively rotatable coaxial parts of the damper that is not coupled with the hub for rotation with the latter. In this way, the viscous damping means forms, with its housing, a "cassette" which can be added to a torsion damper constructed from standard components.

In certain cases, it may be desired not to couple the viscous damping means in common rotation with the hub (or with an axial extension that is fixed with respect to the latter), in particular with a view to avoiding additional manufacturing and/or assembly operations, such as forming splines in the hub.

SUMMARY OF THE INVENTION

An object of the present invention is to provide a novel torsion damping device, of the kind having a viscous damping means which is confined within a "cassette" carried on a torsion damper constructed from standard components, while avoiding coupling the "cassette" with the hub (or with an axial extension which is fixed with respect to the latter) for rotation together; and also to produce other advantages.

In accordance with the invention, a torsion damper of the above kind is characterised in that, for attaching the said housing to the sub-assembly comprising the guide rings, the hub and the damper plate, and for coupling it thereto for rotation therewith but with an initial clearance, viscous damper coupling means are provided, firstly between one of the said portions of the said housing and the guide rings, and secondly between the other said portion of the housing and the damper plate.

The invention enables the hub to be of a standard type, and thus to maximise the number of components, of a conventional dry friction torsion damper, that can be used. Preferably, advantage is taken of the bearing which is inserted radially between the guide rings and the hub. According to one feature of the invention, the said coupling means are formed on an axial extension which is provided on the bearing for this purpose.

The damper plate is preferably mounted so as to be moveable with respect to the hub, through loose coupling means and resilient means of low stiffness. Preferably also, the bearing is coupled with the damper plate through means providing an initial clearance. Using these arrangements, the viscous damping means can be arranged to be inoperative over at least a part of the relative angular displacement between the hub and the damper plate, without having to have recourse to additional local hardening of the hub.

It will be appreciated that the low stiffness resilient means can act effectively, without their action being negatived by the viscous damping means, the latter being connected to a member which is freely rotatable with respect to the hub during the relative angular displacement that takes place between the hub and damper plate.

It is not necessary to carry out the additional and costly operation of locally hardening the hub in order to overcome the effects of impact or "hammer". It will be appreciated that the splines which are conventionally provided on the hub are saved, being now unnecessary, and that furthermore effective sliding of the hub is ensured. Preferably, the damper plate is centered by the bearing with respect to the guide rings, and the viscous damper housing is connected axially, and in the rotational sense, to the bearing. This simplifies the assembly operation.

Thus in this case, coupling in rotation is only necessary between the guide rings and the viscous damper housing, and this leads to still further standardisation of the damper components, so that the only difference as compared with a conventional damper is in the bearing and the viscous damper housing.

In addition, the above mentioned impact effects are preferably reduced because the viscous damping cassette is mounted without any clearance at the centre, so that viscous damping takes place over an increased diameter, for example at the radial level of the spacer elements which connect the guide rings together. This improves the lever arm and so reduces the forces involved.

It will be appreciated that the viscous damping means can be made to have a large radius.

Preferred embodiments of the invention are described, by way of example only, in the detailed description that follows with reference to the accompanying drawings.

BRIEF DESCRIPTION OF THE DRAWINGS

FIG. 1 is a view in axial cross section of a torsion damper according to the invention.

FIG. 2 is a simplified partial view of the loose coupling means which are provided between the hub and the damper plate.

FIGS. 4 and 5 are partial views showing the axial connection between the bearing and a damping disc of the viscous damping means.

DESCRIPTION OF PREFERRED EMBODIMENTS OF THE INVENTION

Figure 3:
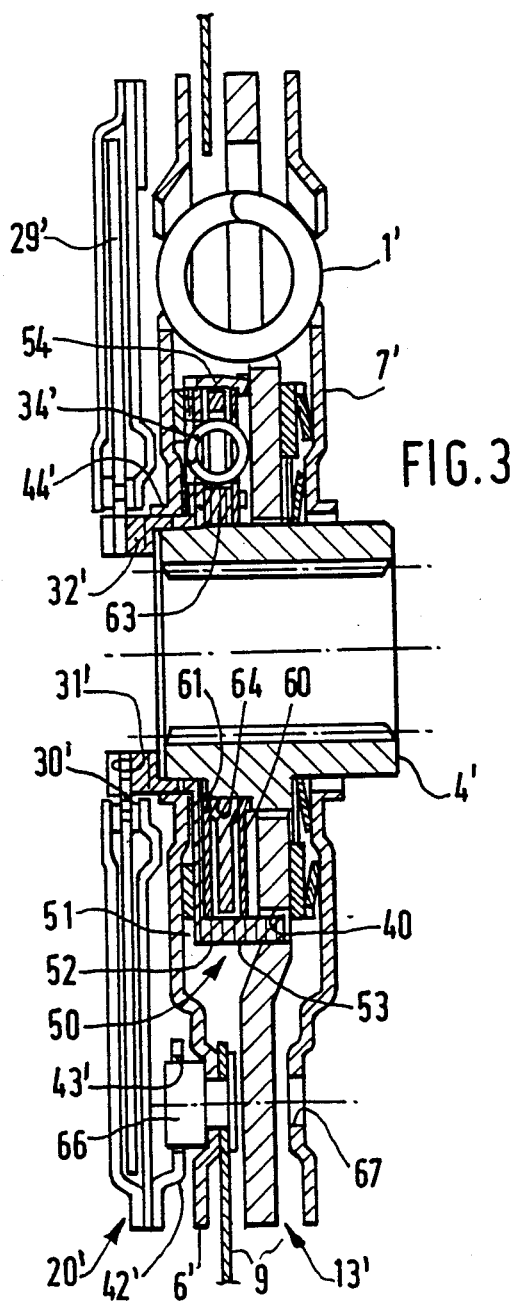
FIG. 3 is a view similar to FIG. 1, but shows another embodiment.

In the embodiments shown in the drawings, the torsion damper is incorporated with a friction clutch for an automotive vehicle. This friction clutch includes two coaxial parts A and B, which are mounted for rotation with respect to each other within the limits of a predetermined angular displacement, and against the action of resilient means 1, dry friction damping means 2, and a viscous damping means 3. The two relatively rotatable parts A and B will be referred to as the "coaxial damper parts" of "coaxial parts".

The coaxial damper part A includes a hub 4, which is provided with a grooved internal bore 5 for mounting the hub on, and for simultaneous rotation with, the driven input shaft of the vehicle gearbox. The coaxial damper part B includes two guide rings 6 and 7, which are connected to each other, and spaced from each other, by means of spacer elements 8, being mounted for free movement around the hub 4. The spacer elements 8 are in the form of spacer bars in this example.

The guide ring 6 carries a clutch disc 9 on which friction pads 10 are fitted. The clutch disc 9 is coupled with the guide rings 6 and 7 by means of the spacer bars 8. In operation of the clutch, the guide rings 6 and 7 are coupled with the engine crankshaft, for rotation with the latter, through the friction pads 10, the latter being then gripped between a pressure plate and a reaction plate. The pressure and reaction plates are not shown. The guide rings 6 and 7 are provided with openings, which in this example are in the form of windows. Circumferentially acting resilient means 1, which here take the form of coil springs, are mounted in the windows 11. The springs 1 are also mounted in further openings in the form of windows 12, which are formed in a damper plate 13 and disposed facing the windows 11. The damper plate 13 is mounted for rotation with respect to the hub 4, through loose coupling means 33 and circumferentially acting resilient means 34 of low stiffness, in the manner described in U.S. Pat. No. 4 669 592. In the present example, the loose coupling means 33 comprise a plurality of teeth of trapezoidal form, together with a plurality of complementary slots, such that each tooth lies, with a clearance, in a corresponding one of the slots as can be seen in FIG. 2. Thus the loose coupling means 33 are partly formed in the inner periphery of the damper plate 13, and partly in a flange or collar portion 36 which is formed as an extension of the thickness of the hub 4 on the outer periphery of the latter.

The resilient means 34 are less stiff than the springs 1, and in the present example they comprise two coil springs diametrically opposed to each other. The springs 4 are mounted partly in slots 37 formed in the hub plate 13, and partly in similar slots formed in the hub 4, and engage these slots through thrust inserts 38. The continuous succession of teeth and tooth engaging slots of the loose coupling means 33 is interrupted locally by the spring housing slots 37.

The damper plate 13 is arranged axially between the guide rings 6 and 7, and is provided with openings 14 through which the spacer bars 8 extend. An annular centering bearing 15, having an L-shaped cross section, is inserted so as to lie axially between the damper plate 13 and the clutch disc 9, and radially between the outer periphery of the hub 4 and the inner edge of the guide ring 6. The bearing 15 has a transverse portion forming an axial spacer between the guide rings 6 and 7, and an axial locating portion acting as a bearing for the inner edge of the guide ring 6. The bearing 15, which is mounted freely around the hub 4, is preferably made of fibre reinforced plastics material. It could however also be made of metal, for example bronze.

A friction ring 16 is inserted axially between the damper plate 13 and the guide ring 7. The friction ring 16 is preferably made of plastics material, and has pins 17 which are engaged in corresponding openings 18 formed in the guide ring 7, thus coupling the friction ring 16 with the latter for rotation with it. A resilient ring 19, which in this example is a Belleville ring, bears on the guide ring 7 and biasses the friction ring 16 towards the hub plate 13. The sub-assembly of the bearing 15 with the friction ring 16 and Belleville ring 19 constitutes the dry friction damping means 2, which are arranged between the damper plate 13 and the guide rings 6, 7.

It will be noted from FIG. 1 that a further friction ring and a further Belleville ring are arranged radially inwards of the friction ring 16 and Belleville ring 19, so as to act between the collar portion 36 and the guide ring 7, acting as a permanently operating dry friction damping means.

The viscous damping means or damper 3 is in the form of a "cassette", and is arranged outside the zone delimited by the guide rings 6 and 7. The viscous damping action of the damper 3 is confined entirely within the interior of a housing 20, which comprises two coaxial housing portions 21 and 22. These housing portions are moveable in the rotational sense with respect to each other about the axis of the assembly. In this example, the housing 20 comprises two transverse, annular plates 24 and 25, which are maintained at a fixed axial spacing from each other by means of an annular spacer 26 and rivets 27. The spacer 26 is an integral, axially extending flange of the plate 24, formed on its outer periphery. Instead of the rivets 27, screws or other suitable similar fasteners may be used. The rivets 27 connect the plates 24 and 25 sealingly to each other at their outer periphery for assembly of these plates.

It will be noted that the housing 20 extends radially outward, past the springs 1.

All of the components of the viscous damper so far mentioned are part of the damper housing portion 21. The other housing portion 22 includes an annular disc 29 which is interposed axially between the two plates 24 and 25. The housing 20 is partially filled with a viscous fluid such as silicone, and is closed internally by means of a sealing joint 35 formed by moulding on the disc 29. Calibrated passages are formed between the disc 29 and the plates 24 and 25.

The sub-assembly consisting of the guide rings 6 and 7, the hub 4 and the damper plate 13 is attached to the housing 20, and is brought into simultaneous rotation with the latter after an initial clearance has been taken up, through a viscous damper coupling means (or mutual engagement coupling means). This coupling means is provided firstly between the viscous damper housing portion 21 and the guide rings 6 and 7, and secondly between the viscous damper housing portion 22 and the damper plate 13. In this example, the portion 22 of the housing 20 is coupled with the damper plate 13 for rotation therewith, but with an initial clearance, by means of the bearing 15, the latter being mounted without a loose coupling means with respect to the hub 4.

A set of teeth 30 projects radially from the inner periphery of the disc 29. Each tooth 30 penetrates without clearance into a complementary slot 31 which is formed in an axial extension 32 of the bearing 15. As can be seen in FIG. 1, this axial extension 32 projects outside the zone delimited by the guide rings 6 and 7, and lies radially inward of the axial portion of the bearing. In cross section, the bearing 15 therefore has an axial length which is determined by the extension 32.

The bearing 15 carries axial projections 39 which penetrate without clearance into recesses or openings 40 in the damper plate 13. In a modification, a circumferential clearance may be provided. In this example, the projections 39 take the form of a plurality of pins, each of which penetrates without clearance into one of the apertures 40 in the damper plate 13. The pins 39 are carried by the outer periphery of the transverse portion of the bearing 15. The latter is preferably in contact, through its outer periphery, with an axial flange 44 formed on the inner periphery of the guide ring 6, in order to increase the bearing surface between the latter and the bearing 15, with respect to which it is mounted freely in rotation. The damper plate 13 is thus centered, as is the viscous damper 3, with respect to the guide rings 6 and 7. All of these arrangements allow out of balance effects to be reduced, since, once the clearance has been taken up in the loose coupling means 33, the hub is centered with respect to the damper plate 13 by means of the trapezoidal teeth.

The bearing 15 can of course be centered with respect to the hub, in which case a clearance exists between the outer periphery of the bearing 15 and the axial flange 44, as is shown in the lower part of FIG. 1.

The viscous damper portion 21 may be connected axially with the guide rings 6 and 7, by seaming or by means of a threaded connection, as is described in the French patent application No. 88.11359 filed on 30th August 1988 U.S. Pat. application Ser. No. 397,255 filed 8/23/88. In that case, the spacer bars 8 have an external threaded portion for assembly with the viscous damper housing, the plates 24 and 25 being gripped between two nuts, one of which also secures the guide rings 6 and 7. It is preferably the disc 29 that is axially connected to the axial flange 32.

The axial connection may be obtained for example by hot forming (or by cold forming when the bearing is of metal), after the teeth 30 have been engaged in the slots 31 (FIG. 4). The bearing extension 32 may be provided with axial teeth 30', penetrating into corresponding openings 31' formed in the disc 29, in which case the axial connection can be obtained using a circlip 70 (FIG. 5) which is engaged in grooves formed in the teeth beyond the disc 29. In a modification, the engaging means may comprise axial orientation pins carried by the disc 29, with each of these pins engaging in a complementary axial opening which is provided in the bearing extension 32. In that event, an axial connection is obtained by force fitting the pins in the openings, the pins being preferably softened for this purpose. It is of course possible to mould metal elements on to the bearing extension 32, for coupling with the inner periphery of the disc 29. For example, a ring can be moulded on to the extension 32, in which case the disc 29 may be made harder than this ring, and be indented on its inner periphery for forcible engagement on the ring and axial connection with the latter by seaming or deformation.

It will be appreciated that the axial connection between the disc 29 and the bearing 15 permits simplification, in all cases, of the coupling that gives simultaneous rotation between the viscous damper housing 20 and the guide rings 6 and 7. This rotational coupling can be obtained using a member in the form of a plate 41 having tabs 42, which are bent out axially and formed with holes 43, so that each tab is held by the head of a respective one of the spacer bars 8 which extends through its hole 43. It will be realised that in this way, the diameter of the disc 29 may be increased, and that impact or "hammer" effects are reduced, these effects occurring on a large diameter between the tabs 42 and the spacer bars 8.

As can be seen in FIG. 1, the rivets 27 also fasten the plate 41 to the plates 24 and 25. The diameter of the disc 29 can be increased even more by welding the two plates 24 and 25 together at their outer periphery through axial flanges, the flange for mounting the rivets 27 then being omitted. In this case, the tabs 42 are themselves welded.

Reference is now made to FIG. 3 which shows a modified embodiment, in which the same reference numerals are used as in FIG. 1 for identical elements, but with the addition of an apostrophe or prime suffix. Here, the springs 34' can be part of a pre-damper which is disposed axially between the damper plate 13' and the guide ring 6', so that the loose coupling means 33' are not then interrupted.

In greater detail, as described in U.S. Pat. No. 4 883 156, the bearing 50 has towards one of its ends a radial flange portion 51, which carries at its outer periphery a plurality of axially extending spacer elements 52. These spacer elements are extended by centring pins 53 which are adapted to centre the damper plate 13'. Each spacer element 52 is thus divided into two portions spaced from each other, each of these portions being associated with one of the centring pins 53. Each of the pins 53 is engaged in an aperture 40' formed in the damper plate 13'. In the space which is thus defined, there extends a resilient tab 54 to give axial orientation, projecting from the periphery of the radial flange portion 51. Reference is invited to FIG. 3 of the above mentioned United States patent, for a better view of a spacer element such as the spacer elements 52. It will be noted that each tab 54 has the shape of a hook at its free end, for attachment by a snap fit on the guide ring 60, 61 of the pre-damper. This allows a pre-assembled unit to be made, comprising the pre-damper (provided with guide rings 60 and 61 arranged on either side of a damper plate 63) and the bearing 50. This pre-assembled unit is adapted to then be mounted in grooves 64 which are provided on the hub 4' so as to mesh, without clearance, with complementary teeth formed on the damper plate 63 of the pre-damper.

Each guide ring 60, 61 is extended by two tabs at its outer periphery, respectively and on either side of the spacer elements 52, for connection with the radial flange portion 51 of the bearing so as to rotate with the latter. The bearing 50 is in contact through its outer periphery with the axial flange 44' of the guide ring 6', with the bearing terminating in the axial extension 32' which projects radially towards the axis of the assembly for meshing with the teeth 30' of the disc 29'. It will be noted that, in this case, the tabs 42' cooperate in mutual engagement with the fastening rivets 66 which secure the clutch disc 9' to the guide ring 6'.

In operation, in all cases, relative movement first of all takes place between the damper plate 13 or 13' and the hub 4 or 4', due to the fact that the springs 1 or 1' have greater stiffness than the springs 34 or 34'. In a second stage of operation, the clearance in the loose coupling means 33 or 33' is taken up, so that relative rotational movement then takes place between the damper plate 13 or 13' and the guide rings 6, 7 or 6', 7', with the bearing 15 or 50 being displaced with respect to the axial flange 44 or 44'. It will be noted that it is only during this second stage that the viscous damping means operates, since in the first stage, no relative movement takes place between the damper plate 13 or 13' and the guide rings 6, 7 or 6', 7'.

It will have been gathered from the foregoing that the projections 39 and pins 53 can penetrate with a clearance into the apertures 40 or 40', which allows the viscous damping means to operate later. Similarly, a clearance may be provided between the teeth 30 or 30' and the slots 31 or 31', in such a way that the disc 29 operates like a drawer in the viscous damping means 3. The viscous damper can then operate during the relative angular displacement between the hub 4 or 4' and the damper plate 13 or 13'. A circumferential clearance may also be provided between the holes 43 or 43' and the spacer bars 8 or rivets 60.

Figure 6:
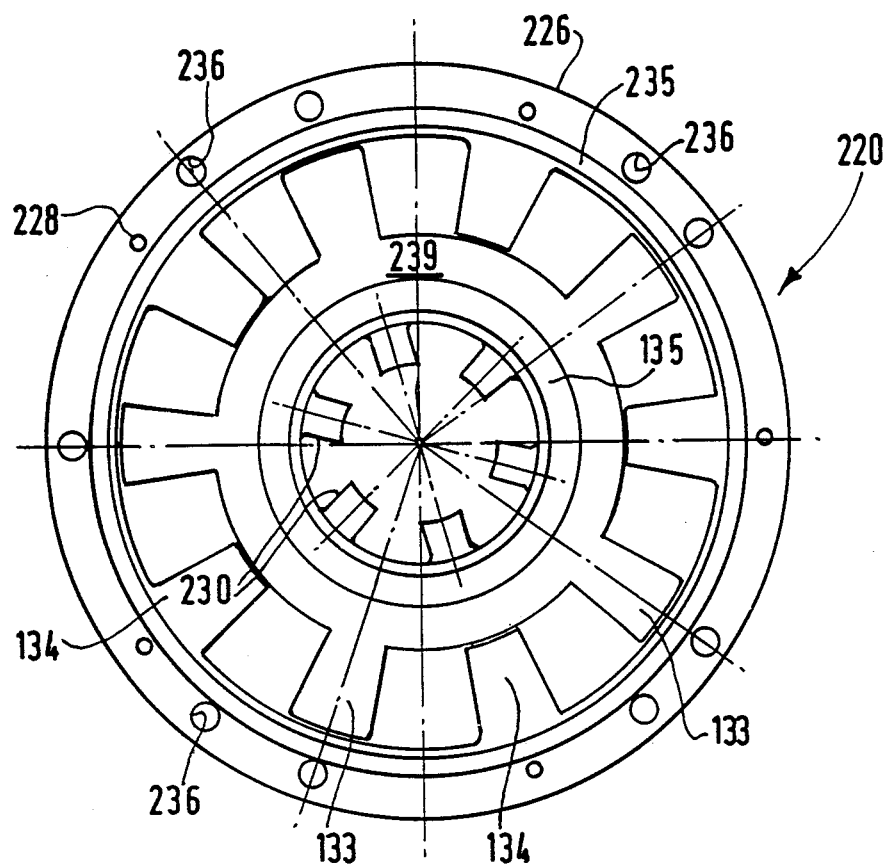
FIG. 6 is an elevation of one modified embodiment of the viscous damping means, in which one of the two portions of the housing is omitted.

The present invention is of course not limited to the embodiments described. Thus, yet another embodiment is illustrated in FIG. 6, in which the viscous damping means includes a plurality of vanes 133, 134, trapezoidal in shape and forming two groups which are mounted in head to toe relationship, extending generally in radial planes intersecting the axis of the assembly. Any one vane of one of the two groups is circumferentially interposed between two vanes of the other group, as described in both the French published patent application No. FR 2 597 181A and the above mentioned French patent application No. 88.11359. In this example, those elements which are common with those shown in FIG. 1 carry the same reference numerals prefixed with the numeral 2. It will be noted that in this example, the two plates of the housing 220 of the viscous damper are connected together through a first group of rivets (not shown), which extend through holes 228 in the spacing portion 226, the latter being separate from the two housing plates. These rivets, and their associated holes 228, are separate from a second group of rivets and associated holes 236, which are provided for securing the tabs 42 in FIG. 1. It will be noted that the spacing portion 226 also carries a seal 236 on each of its faces. The vanes 134 are carried by the spacing portion 226, while the disc 229 carries the vanes 133, being cut out accordingly.

The other arrangements described in the above mentioned French published patent application are also applicable here. The viscous damping means may be disposed on the side of the assembly corresponding to the guide ring 7, using for example the free hole 67 (FIG. 3) of the guide ring 7' for securing it in rotation with the tabs 42 or 42', by means of a rivet similar to the rivet 66.

The damper plate 13 may be coupled with the hub 4 for rotation with the latter. In this case, the bearing 15, with its axial extension 32, is coupled with the guide rings 6 and 7 for rotation with them, by means of a profiled connection. The latter may for example comprise pins passing through openings as in FIG. 1. The damper plate 13 can thus be coupled with the other portion 21 of the viscous damper housing for rotation with it, and the damper plate can be provided with spacer bars at its outer periphery for fastening, by welding, riveting or other means, to the outer periphery of the plates 24 and 25. In a further modification, one of the guide rings can be fixed to the hub, being connected to the other guide ring by means of the spacer bars. At the same time the bearing, again having an axial extension, can be connected to the other guide ring for rotation with the latter, by being inserted radially between the hub and this guide ring. In that case, the damper plate is mounted freely with respect to the hub, and is provided with spacers for connection with the other portion of the viscous damper housing.

Instead of being in the form of spacer bars, the spacer elements 8 may be flat, having tenons each of which extends through a corresponding opening formed in the guide ring, for connection by deformation to the latter.

The guide rings may have deformations such as bosses or lugs, for connection with the tabs of the housing 20 or the like through cooperating profiled surfaces, in order to produce simultaneous rotation.

The torsion damper may be fixed directly on to the engine crankshaft by means of one of its guide rings. The damper plate 13 may of course be split into two parts, as described in U.S. Pat. No. 4 698 045, and it is possible to reverse the arrangements so far as the member 41 is concerned. This latter may be carried by the guide ring 7, using a hole 67 (FIG. 3) and by riveting, the tab 42 then engaging, by means of its hole 43, on a projection carried by the outer periphery of the viscous damper plates 24 and 25. This extension may for example take the form of a riveted pin or a boss.

The resilient means 1 and 34 may comprise blocks of resilient material. The openings in which these resilient means are mounted may, so far as the damper plate 13 is concerned, consist of slots which are open at the outer periphery of the damper plate. Finally, the spacer elements 8 may of course extend through window openings as described in European published patent application No. EP 0 304 169A.

What is claimed is:

1. A torsion damping device comprising: a hub; a first coaxial part including two guide rings surrounding the hub and defining an axially extending zone of the device; a second coaxial part including a damper plate, the guide rings being disposed on either side of the damper plate, with the hub, damper plate and guide rings together defining a sub-assembly and the said coaxial parts being coaxial with each other; and means partly on the hub and partly fixed with respect to a component or components, selected from the group consisting of the guide rings taken together and the damper plate, coupling the hub with the said component or components for rotation together but defining an initial clearance therebetween; resilient means arranged between said coaxial parts; and damping means arranged between said coaxial parts, the device including means mounting the two coaxial parts for rotational movement with respect to each other within the limits of a predetermined angular displacement against the action of the said resilient means and damping means, wherein the damping means consist of dry friction damping means and a viscous damping means, the dry friction damping means being operatively connected between the damper plate and guide rings, and comprising a bearing extending radially between one said guide ring and the hub, the viscous damping means being outside the said zone and comprising a housing and means entirely within the housing for effecting viscous damping, the housing comprising two portions with means mounting said housing portions for rotational movement with respect to each other, the device further including viscous damper coupling means, coupling one said housing portion to the guide rings and the other said housing portion to the damper plate, whereby the housing is attached to the said sub-assembly and is coupled thereto for rotation therewith after an initial clearance has been taken up.

2. A device according to claim 1, wherein the bearing is also part of the viscous damper coupling means.

3. A device according to claim 2, wherein the said bearing has an axial extension outside the said zone, the viscous damper coupling means being formed partly on the said extension.

4. A device according to claim 3, including loose coupling means mounting the damper plate for rotational movement with respect to the hub, the said bearing having projections or pins for coupling it in rotation, with an initial clearance, with the damper plate.

5. A device according to claim 4, wherein a said guide ring has an axial flange, the bearing being mounted freely with respect to the guide rings and being centred by means of the said axial flange.

6. A device according to claim 3, wherein the axial extension of the bearing is coupled with the appropriate one of said housing portions for rotation therewith.

7. A device according to claim 6, wherein the said bearing has slots, the said viscous damper coupling means including teeth which are carried by one of the said housing portions, each of said teeth being engaged in a corresponding one of the said slots.

8. A device according to claim 3, wherein the axial extension of the bearing is coupled axially to the appropriate one of said housing portions.

9. A device according to claim 8, further comprising a member which is carried by a group of elements selected from the guide rings and the housing, wherein only the other one of the said housing portions is coupled with the guide rings for rotation therewith with an initial clearance, being so coupled by simple engagement, in holes formed in the said member, of projections carried by the other one of the said groups.

10. A device according to claim 9, wherein the said member is carried by the housing at its outer periphery, and is provided with tabs which are offset axially and which engage, through holes therein, on the heads of spacer elements connecting the guide rings together.

* * * * *